Patented Feb. 23, 1932

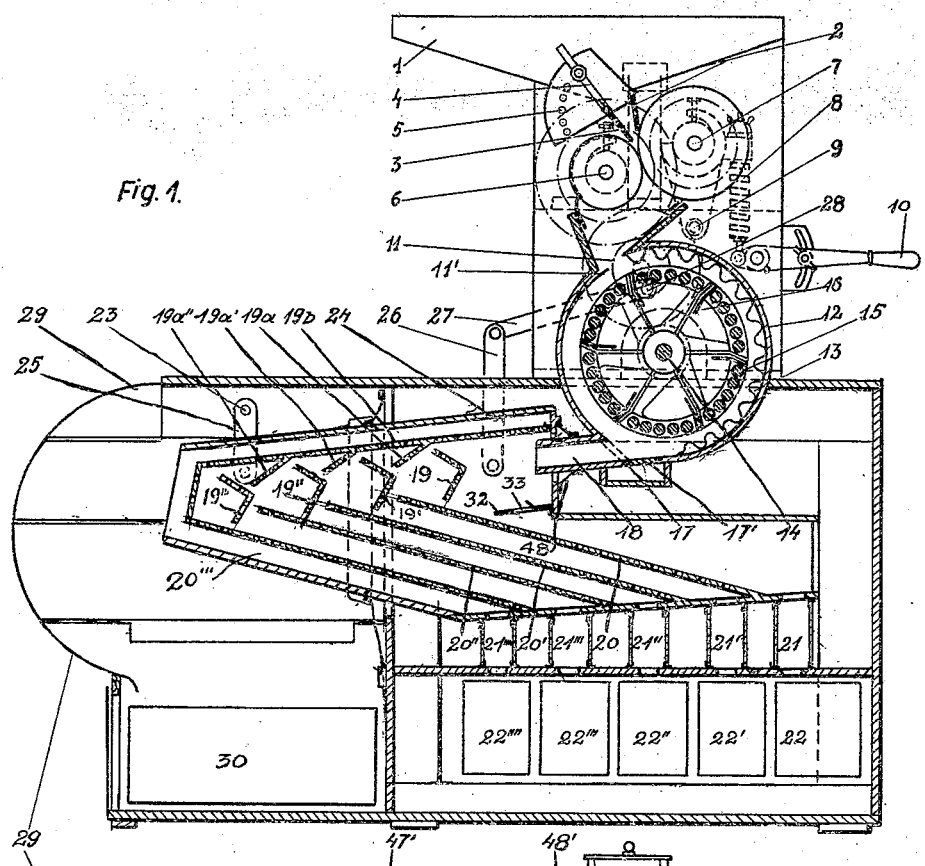
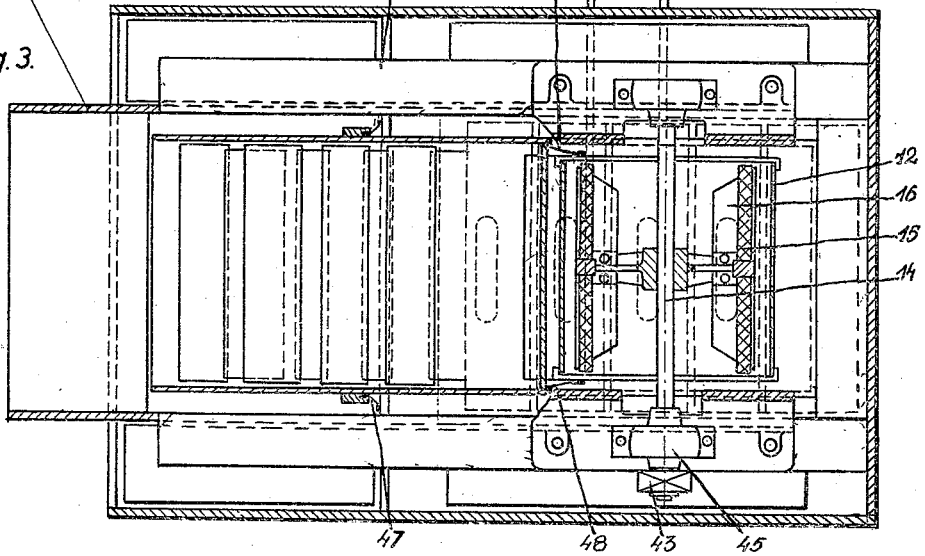

1,846,783

UNITED STATES PATENT OFFICE

KAROL BERBEKA, OF LWOW, POLAND

APPARATUS FOR THE GRADING OF FLOUR

Application filed September 21, 1927, Serial No. 221,053, and in Poland October 2, 1926.

The invention relates to an improved apparatus for the reducing, husking and pulverizing of grain for the grading of flour For the production of flour from grain it was hitherto customary to employ exclusively mills which served considerable agricultural areas, in consequence of which the farmers were compelled to convey the grain and the flour respectively from a distance, so that the ground products were rendered expensive.

By means of the present invention it is rendered possible to provide a comparatively small portable unit which reduces, husks and pulverizes the grain and grades the flour thus obtained so thoroughly that the resulting flour products are in no way inferior to the products of the ordinary mills.

In order to obtain this result the principal object of the invention is to provide in an apparatus for the reducing, husking and pulverizing of grain and for the grading of flour, comprising a reducing device, a husking and pulverizing device and a sifting device, means whereby the shifting device can be made of such small size in proportion to its output that it is rendered possible to obtain an apparatus of the kind set forth which is portable and at the same time has the necessary efficiency for the purpose in view. The sifting device, according to the invention is adapted to reciprocate and comprises in combination: a series of sieves of V-shaped cross section having their longitudinal edges directed against the direction of flow of the material to be sifted; upper guide sieves co-operating with said V-shaped cross section sieves and each arranged behind one of the latter; an upper inclined finishing sieve member also co-operating with said V-shaped cross section sieves and arranged above said guide sieves; a series of downwardly inclined sieves likewise co-operating with said V-shaped cross section sieves and arranged below the latter; and collecting receptacles towards which said downwardly inclined sieves direct the sifted material.

In the operation of the device according to the invention, the ground product, after leaving the pulverizing device, passes through the sifting device and is collected in a series of receptacles located one behind the other, the said receptacles being arranged in precipitation chambers of comparatively large cross section, the said chambers being connected to one another by suitably arranged openings. The object of this arrangement is to diminish the velocity of the air passing through with the flour dust so as to obtain a rapid and reliable deposition of the dust in the receptacles. It will be obvious that the portable unit constituted by the sieve according to the invention and the other devices above set forth, may be driven either by hand or by a motor of small power, such as could be practically employed on individual farms.

A preferred constructional form according to the invention is illustrated by way of example in the accompanying drawings, in which:

Fig. 1 is a longitudinal section through the apparatus, partly in elevation,

Fig. 2 is a cross section through the apparatus showing the most important parts and Fig. 3 is a horizontal section through the sifter and pulverizer.

Figure 2:
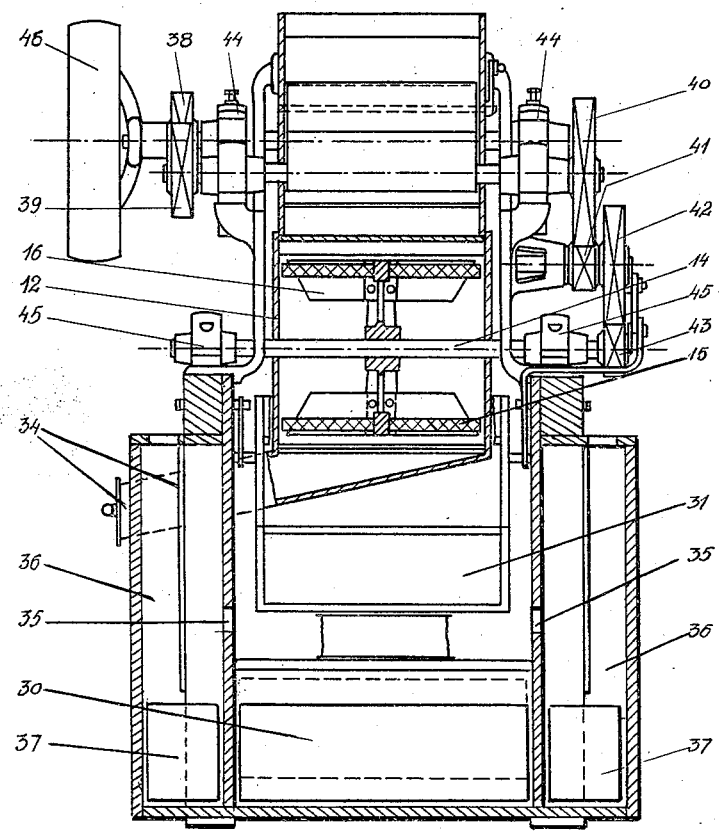

The upper part of the apparatus consists of a reduction device of the roller type to which the grain is conveyed through the feed device 1. This latter device is provided with a fixed guide 2 and with a movable guide 3 which latter may be adjusted as desired with regard to the guide 2 by means of a handle 4. The guides 2 and 3 form the passage through which the grain is conveyed to the rollers which rotate about the axes 6 and 7. By the adjustment of the handle 4 with the aid of holes 5, the amount of grain flowing between the guides 2 and 3 can be diminished or increased. The reduction device is of known construction per se. The roller rotating about the axis 7 can be caused to press against the other roller with greater or less force as desired inasmuch as the said first named roller can be rotated about the axis 9 and is pressed against the roller rotating about the axis 6 by the spring 8. For the purpose of regulating the pressure between the rollers, a handle 10 is provided the rotation of which decreases or increases the pressure of the spring 8.

The reduced grain passes from the rollers through the passage 11 to the pulverizing device. This latter is provided with a shaft 14 which rotates at high speed and is journalled in bearings 45. The shaft carries a drum on the periphery of which a series of parallel rods 15, preferably provided with roughened surfaces is arranged. Between the rods 15 radial vanes 16 are fastened which produce a strong current of air during the rotation of the shaft 14 and thus convey the ground material through the passage 18 towards the sifter. The drum 14, 15 rotates in the interior of the fixed housing 12 which is lined, as shown in Fig. 1, with sheet metal 13 provided with corrugations or semi-circular slats. The lining of metal 13 has the object of effecting the husking or pulverizing of the grains, the latter being thrown off by the rods 15 and striking upon the projecting corrugations of the coating, rebounding from these latter, returning to the rods 15, and then becoming projected away from these latter once again and so on. In order to avoid the escape of the air current produced towards the inlet channel 11, a partition 11′ is provided which guides the air current in such manner that it flows past the edge of the inlet passage 11. The whole current of air thus flows together with the pulverized product through the passage 18 towards the sifter. If it is desired to free the grains in the first place from the husks, the rollers are set far apart from one another in order to avoid grinding of the grain, whereupon the current grain instead of being guided towards the sifter, is led directly towards the sloping outlet channel 34. This is effected by turning the flap 17 from the position 17′ into the position marked in Fig. 1 in dotted lines. In this position the flap closes the passage 18 and connects the pulverizing device with the channel 34. If desired, it is possible in this way to remove grain which has been husked and freed from dust, which fulfils an important requirement in the case of the production of very fine flour.

After leaving the passage 18 the air, together with the grain passes into the sifter which consists of a vessel which is moved to and fro and which contains a series of sieves 19, 19′, 19″, 19‴ of V-shaped cross section arranged parallel to and behind one another, the longitudinal edges of said sieve being directed towards the outlet channel 18 of the pulverizing device. Above the sieves 19, 19′, 19″, 19‴ upper inclined guiding sieves 19a, 19a′, 19a″ are arranged and above these latter a slightly inclined upper enclosing sieve 19b is arranged. Below the V-shaped sieves, inclined sieves 20, 20′, 20″, 20‴ are arranged the object of which is to convey the ground material of various grades through the flexible tubes 21, 21′, 21″, 21‴ to the individual flour collecting containers 22, 22′, 22″, 22‴, 22⁗. All the sieves enumerated are, as already mentioned above arranged inside the case 31 of the sifter which case executes a to and fro movement and in consequence of this must be rendered air tight with regards to all the fixed parts of the apparatus by means of flexible tubes 21, 21′ and so on, as also by means of flexible diaphragms 47, 47′, 48, 48′.

The case of the sifter 31 is moved by means of the lever 26 which is reciprocable about the pivot 24 and the lower arm of which is pivotally connected to the said sifter case 31. The front end of the sifter case is suspended by means of the link 25 the upper end of which is adapted to swing about the pin 23 arranged in the fixed housing 29. The upper arm of the two-armed lever 26 is reciprocated to and fro by means of the crank rod 27 which latter is actuated by means of the crank pin 28 fixed to the toothed wheel 42. The toothed wheel 42 serves through the intermediary of a second toothed wheel 43 for driving the shaft 14 of the pulverizing device (see Fig. 2). The drive of the reducing device and of the pulverizing device is effected in the constructional example according to Figs. 1 and 2 through the agency of the belt pulley 46 which directly rotates the shaft 7 and which drives the shaft 6 through the medium of the toothed wheels 38 and 39 said toothed wheels being journalled in bearings 44. A comparatively large toothed wheel 40 is keyed on to the other end of the shaft 6, which toothed wheel 40 engages with the small toothed wheel 41 which in its turn drives the comparatively large toothed wheel 42 which engages the small toothed wheel 43. In consequence of the fact that the toothed wheel 43 directly rotates the shaft 14 of the pulverizing device, the result is obtained that the belt pulley 46, which rotates at a relatively low speed drives the rollers rotating about the axes 6 and 7 respectively in opposite directions at a low speed, but on the other hand causes the shaft of the pulverizing device to rotate at a very high speed, the lever 26 being at the same time moved to and fro and thus causing the sifter case 31 to move to and fro.

The flour dust emerging from the sifter case 31 through the front outlets is collected in the interior of the housing 29 of the device in a series of containers, for instance 30, 37 the arrangement being such that these containers are arranged in precipitation chambers 36 of comparatively large cross section which chambers are connected to one another by means of suitably arranged openings. The object of this arrangement is to effect a diminution of the high speed of flow of the air passing from the pulverizing device through the sifter. In consequence of the sudden diminution of speed of the air the flour dust is precipitated into the containers 30 and 37. In order to prevent an immediate downflow of the current of air and of the ground material after leaving the passage 18, an inclined guide surface 32 is arranged below this passage. In this guide surface an opening 33 is provided which is formed by bending one part of the material of which the said guiding surface 32 is made upwards and bending another part of the said material downwards.

The object of this arrangement of the opening is to prevent the immediate descent of the ground material underneath the guide surface 32 so that only that part of the ground material can fall down which is thrown back from the first prismatic sieve 19.

I claim:

1. A reciprocating sifting device particularly for use in an apparatus for the reducing, husking and pulverizing of grain and for the grading of flour, wherein a husking and pulverizing device and a sifting device are provided, comprising in combination: a casing having an opening for the admission of pulverized grain, a series of sieves of V-shaped cross section arranged within said casing behind one another and parallel to one another, the longitudinal edges of which sieves are directed towards the opening for the admission of pulverized grain, upper inclined guide sieves co-operating with said sieves of V-shaped cross section, an upper inclined finishing sieve member also co-operating with said sieves of V-shaped cross section, a series of inclined sieves likewise co-operating with said sieves of V-shaped cross section and arranged below said sieves of V-shaped cross section, and collecting receptacles to which the ground material of different grades of fineness is conveyed by said last named series of inclined sieves.

2. A reciprocating sifting device particularly for use in an apparatus for the reducing, husking and pulverizing of grain and for the grading of flour, wherein a husking and pulverizing device and a sifting device are provided, comprising in combination: a casing having an opening for the admission of pulverized grain, a series of sieves of V-shaped cross section arranged within said casing behind one another and parallel to one another, the longitudinal edges of which sieves are directed towards the opening for the admission of pulverized grain, upper inclined guide sieves co-operating with said sieves of V-shaped cross section, an upper inclined finishing sieve member also co-operating with said sieve of V-shaped cross section, and a series of inclined sieves likewise co-operating with said sieves of V-shaped cross section and arranged below said sieves of V-shaped cross section, in further combination: with collecting receptacles arranged in a series one behind the other to which receptacles the ground material of different grades of fineness is conveyed by said last named series of inclined sieves, and precipitation chambers of relatively large cross section within which said collecting receptacles are arranged, and which are connected with one another by corresponding passages.

3. A reciprocating sifting device particularly for use in an apparatus for the reducing, husking and pulverizing of grain and for the grading of flour, wherein a husking and pulverizing device and a sifting device are provided, comprising in combination: a casing having an opening for the admission of pulverized grain, a series of sieves of V-shaped cross section arranged within said casing behind one another and parallel to one another, the longitudinal edges of which sieves are directed towards the opening for the admission of pulverized grain, upper inclined guide sieves co-operating with said sieves of V-shaped cross section, an upper inclined finishing sieve member also co-operating with said sieves of V-shaped cross section, a series of inclined sieves likewise co-operating with said sieves of V-shaped cross section and arranged below said sieves of V-shaped cross section, and collecting receptacles to which the ground material of different grades of fineness is conveyed by said last named series of inclined sieves, said sifting device which is moved to and fro being connected with the fixed part of the apparatus and the individual passages therein by means of flexible members.

4. A reciprocating sifting device particularly for use in an apparatus for the reducing, husking and pulverizing of grain and for the grading of flour wherein a husking and pulverizing device and a sifting device are provided, comprising in combination: a casing having an opening for the admission of pulverized grain; a series of sieves of V-shaped cross section arranged within said casing behind one another and parallel to one another, the longitudinal edges of which sieves are directed towards the opening for the admission of pulverized grain, upper inclined guide sieves co-operating with said sieves of V-shaped cross section, an upper inclined finishing sieve member also co-operating with said sieves of V-shaped cross section, and a series of inclined sieves likewise co-operating with said sieves of V-shaped cross section and arranged below said sieves of V-shaped cross section, in further combination: with collecting receptacles arranged in a series one behind the other to which receptacles the ground material of different grades of fineness is conveyed by said last named series of inclined sieves, and precipitation chambers of relatively large cross section within which said collecting receptacles are arranged and which are connected with one another by corresponding passages, said sifting device which is moved to and fro being connected with the fixed parts of the apparatus and the individual passages therein by means of flexible members.

5. A reciprocating sifting device particularly for use in an apparatus for the reducing, husking and pulverizing of grain and for the grading of flour wherein a husking and pulverizing device and a sifting device are provided, comprising in combination: a casing having an opening for the admission of pulverized grain; a series of sieves of V-shaped cross section arranged within said casing and having their longitudinal edges directed against the direction of flow of the material to be sifted; upper guide sieves co-operating with said sieves of V-shaped cross section and each arranged behind one of the latter; an upper inclined finishing sieve member also co-operating with said sieves of V-shaped cross section and arranged above said guide sieves; a series of downwardly inclined sieves likewise co-operating with said sieves of V-shaped cross section and arranged below the latter and collecting receptacles towards which said downwardly inclined sieves direct the sifted material.

In testimony whereof I have hereunto set my hand.

KAROL BERBEKA.